United States Patent [19]

Earleson et al.

[11] Patent Number: 4,498,016

[45] Date of Patent: Feb. 5, 1985

[54] LOCOMOTIVE GOVERNOR CONTROL

[75] Inventors: Walter E. Earleson; Dennis M. King, both of Peoria; Michael E. Moncelle, Normal, all of Ill.

[73] Assignee: Caterpillar Tractor Co., Peoria, Ill.

[21] Appl. No.: 520,372

[22] Filed: Aug. 4, 1983

[51] Int. Cl.³ .............................................. F02C 9/04
[52] U.S. Cl. ............................... 290/40 R; 60/39.281; 290/14
[58] Field of Search ...................... 290/14, 40 R, 40 A, 290/40 C; 60/281; 322/36

[56] References Cited

U.S. PATENT DOCUMENTS

| | | | |
|---|---|---|---|
| 3,105,186 | 9/1963 | Zelina | 322/36 |
| 3,412,258 | 11/1968 | Satter | 290/40 |
| 3,551,685 | 12/1970 | Corry | 290/14 |
| 3,777,174 | 12/1973 | Butscher et al. | 290/40 R |
| 3,832,846 | 9/1974 | Leeson | 60/39.281 R |
| 3,878,400 | 4/1975 | McSparran | 290/14 |
| 4,021,677 | 5/1977 | Rosen et al. | 290/40 R |
| 4,292,534 | 9/1981 | Diegel et al. | 290/40 R |
| 4,380,894 | 4/1983 | Abo et al. | 60/39.281 R |

Primary Examiner—J. V. Truhe
Assistant Examiner—W. E. Duncanson, Jr.
Attorney, Agent, or Firm—Krass, Young & Schivley

[57] ABSTRACT

A digital processor implemented electronic governor for engine-generator units including a first control loop for producing a speed error and controlling fuel delivery setting as a function thereof and a second control loop for detecting rack error and producing a field excitation current control signal as a function thereof. Power dips and overruns are voided by modifying rack error as a function of engine acceleration. Means are provided for developing speed errors and rack control signals despite a breakdown in the rack position indicator. Open loop lower power setting controls are provided. Wheel-slip control, power limiting and variable acceleration functions are provided.

22 Claims, 17 Drawing Figures

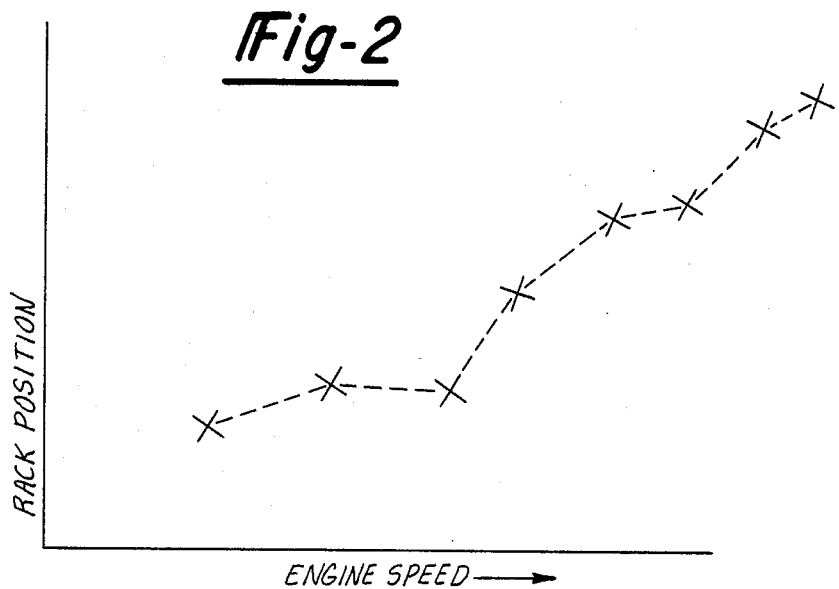
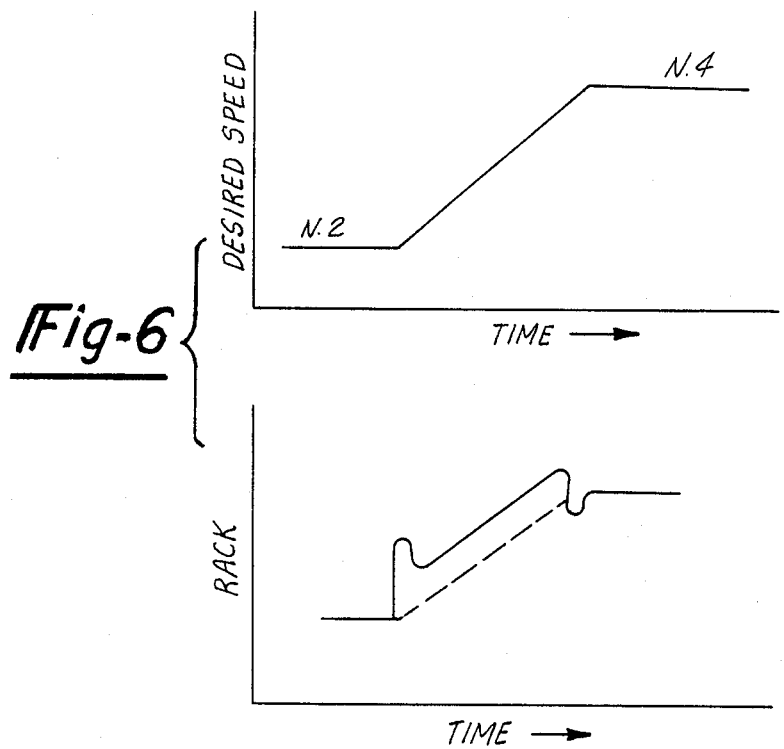

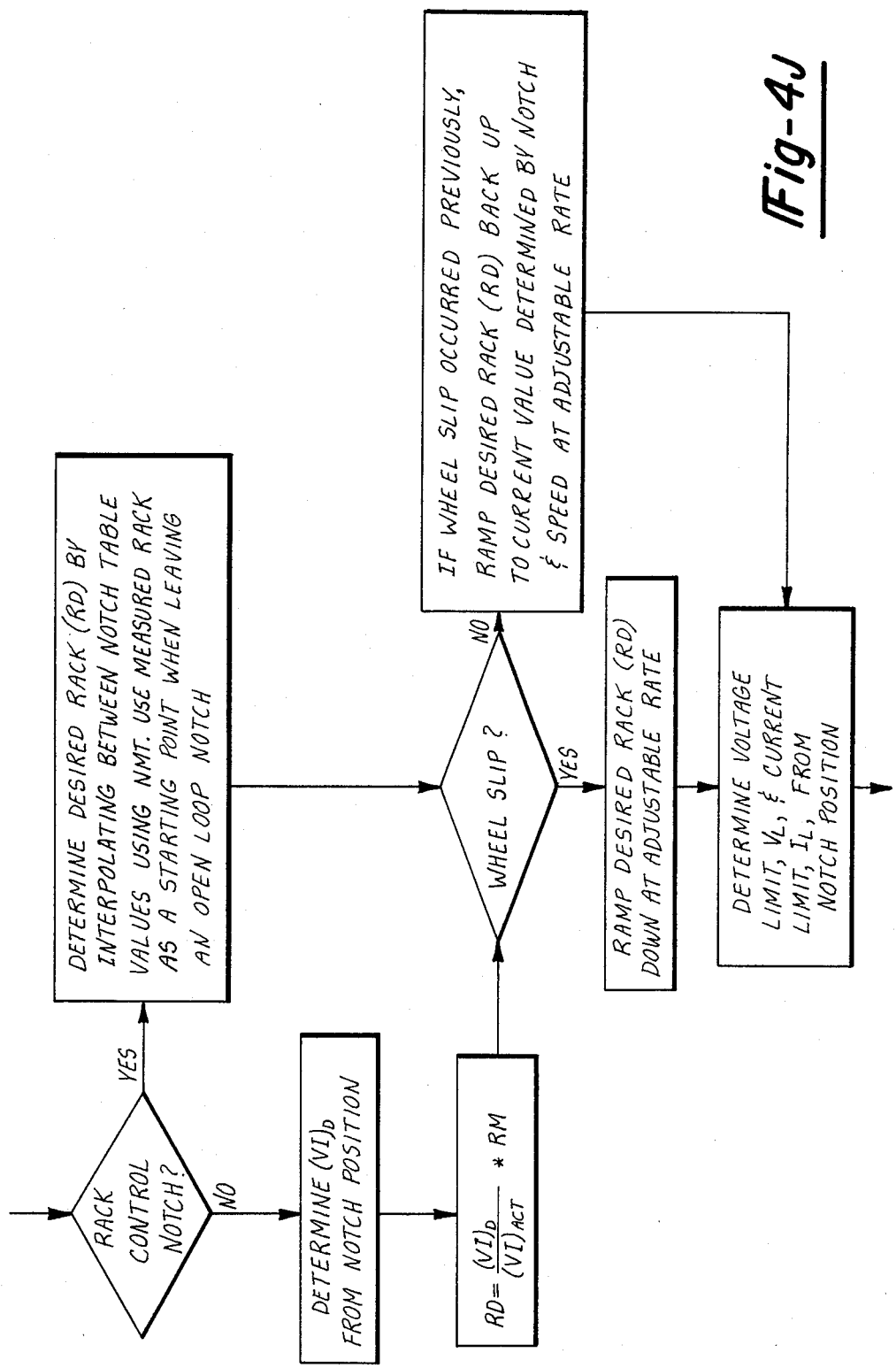

LOCOMOTIVE GOVERNOR CONTROL

DESCRIPTION

Technical Field

This invention relates to control systems, often called "governors", for engine-generator units and particularly to an electronic governor which provides improved performance characteristics for engine-generator units.

BACKGROUND OF THE INVENTION

The term "engine-generator unit", as used in this patent specification, refers to the combination of a fuel burning engine and an electrical generator mechanically connected to the engine to be driven thereby. The engine may be a turbine, diesel or gas internal combustion engine, alcohol, methanol or mixed fuel engine or any other fuel burning engine, the speed and power output of which may be controlled through variations in the fuel delivery rate. The electrical generator may also vary considerably in physical characteristic, but in all cases is subject to output power control through field excitation level.

Engine-generator units are found in numerous applications, including diesel-electric locomotives, trucks, earth-moving and off-road vehicles having traction motor drives and in stationary and mobile power generating stations. Although in some applications, relatively simple mechanical isochronous governors will suffice, engine-generator units which are used in applications presenting wide variations in load and frequent transitions between load and or speed settings present a complex control problem. For example, transitions between power settings and/or load requirements in a diesel locomotive often result in smoking due to a lack of proper correlation between fuel delivery rate and engine speed. In addition, a transition in power demand can and typically does produce a response such as a power dip or overrun which is opposite in sense to the operator-generated command. These and other adverse characteristics have been typical of prior art systems.

SUMMARY OF THE INVENTION

According to one aspect of the present invention an improved electronic governor characterized by improved efficiency in the operation of an engine-generator unit is provided. In general this is accomplished in a system which includes means such as an operator or program controlled device for establishing a power setting, a speed calculator for deriving a speed error signal as function of the power selector setting and the actual engine speed and for applying an output which is a function of the speed error signal to the fuel delivery rate control, and a power setting calculator for deriving a second error signal as a function of actual engine speed and actual fuel delivery rate control setting and for applying an output which is a function of the second error signal to the field current or field excitation control device. Throughout the following specification the first calculator is typically referred to as a "speed calculator" or "speed loop" and the second calculator is typically referred to as a "rack calculator" or a "power control loop". The overall result of the invention is a speed dominated system capable of producing optimum speed, fuel delivery and power settings at all times.

According to a second aspect of the invention an electronic governor capable of providing improved objective operator response characteristics under changing load and changing power setting conditions is provided. In general this is accomplished in a system of the type described above by providing an input to the power control loop or rack calculator which is a function of engine acceleration and which modifies or overrides the actual fuel delivery rate setting to prevent power dips or overruns which are characteristic of prior art systems.

According to a third aspect of the invention a control system or electronic governor capable of flexibility in accommodating the performance characteristics of a given engine-generator unit is provided. In general this is accomplished in a system of the type described above by implementing the calculators as digital processors capable of accessing a memory or combination of memories, storing appropriate control equations (loop transfer functions) and also a set of constants which are empirically determined from operation of each individual engine generator units. In the preferred form the memory or combination of memories is sub-divided physically so that the empirically determined constants may be added in a modular fashion to an otherwise complete and pre-programmed control system.

In accordance with a fourth aspect of the invention irregularities in low power setting operation due to the switching on and off of parasitic (accessory) loads on the engine is avoided. This may be accomplished by means for sensing the existence of a low power setting in the operator or program controlled device and effectively bypassing the field current control loop and providing a fixed field excitation value which has been precalculated to correspond to a particular low power setting. Alternatively, this may be accomplished by measuring the parameters of power output of the generator to calculate an appropriate signal to the field current control loop which is not affected by the variations in parasitic loads.

According to a fifth aspect of the invention a method of accurately and efficiently controlling the operation of an engine-generator unit of the type having rack position (fuel delivery rate) and field current controls is provided. In general this is accomplished in a method which comprises the steps of:

(a) generating a power setting signal;
(b) developing a desired speed signal;
(c) developing a speed error from a comparison of the desired speed signal and an actual speed signal;
(d) setting the rack control as a complex function of the speed error;
(e) developing a desired rack signal from the actual speed;
(f) developing a rack error signal from a comparison of desired rack and actual rack; and
(g) setting field current as a complex function of the rack error.

According to a sixth aspect of the invention a method of avoiding power dips and overruns due to power demand transitions in an engine-generator unit is provided. In general this is accomplished in a method which involves the steps of generating an error signal which controls field current setting from a combination of a desired rack signal derived from actual engine speed, an actual rack position signal and a signal proportional to engine acceleration, the latter signal being combined in opposition to the actual rack signal and in which the correct relationship to the desired rack signal is obtained. The result is a system response to a power increase command, for example, which produces an immediate field excitation increase despite the fact that engine inertia might produce a less rapid increase in the desired rack signal which is derived as a function of actual engine speed. During an increase in engine speed, the amount of rack required just to accelerate the system inertia is subtracted from the measured rack so that the resulting measured rack is a true representation of the net power being output by the engine.

These and other features and advantages of the invention will be best appreciated and understood from a reading of the following specification which describes in detail an illustrative embodiment of the invention.

BRIEF DESCRIPTION OF THE DRAWINGS

FIG. 2 is a graph of engine speed versus rack position for optimum efficiency operation in a diesel engine;

FIG. 4I through 4L is a flowchart of a further option to FIG. 4G;

FIG. 6 is a chart of control characteristics in an acceleration or power-increase condition.

DETAILED DESCRIPTION OF THE SPECIFIC EMBODIMENT

Figure 1:
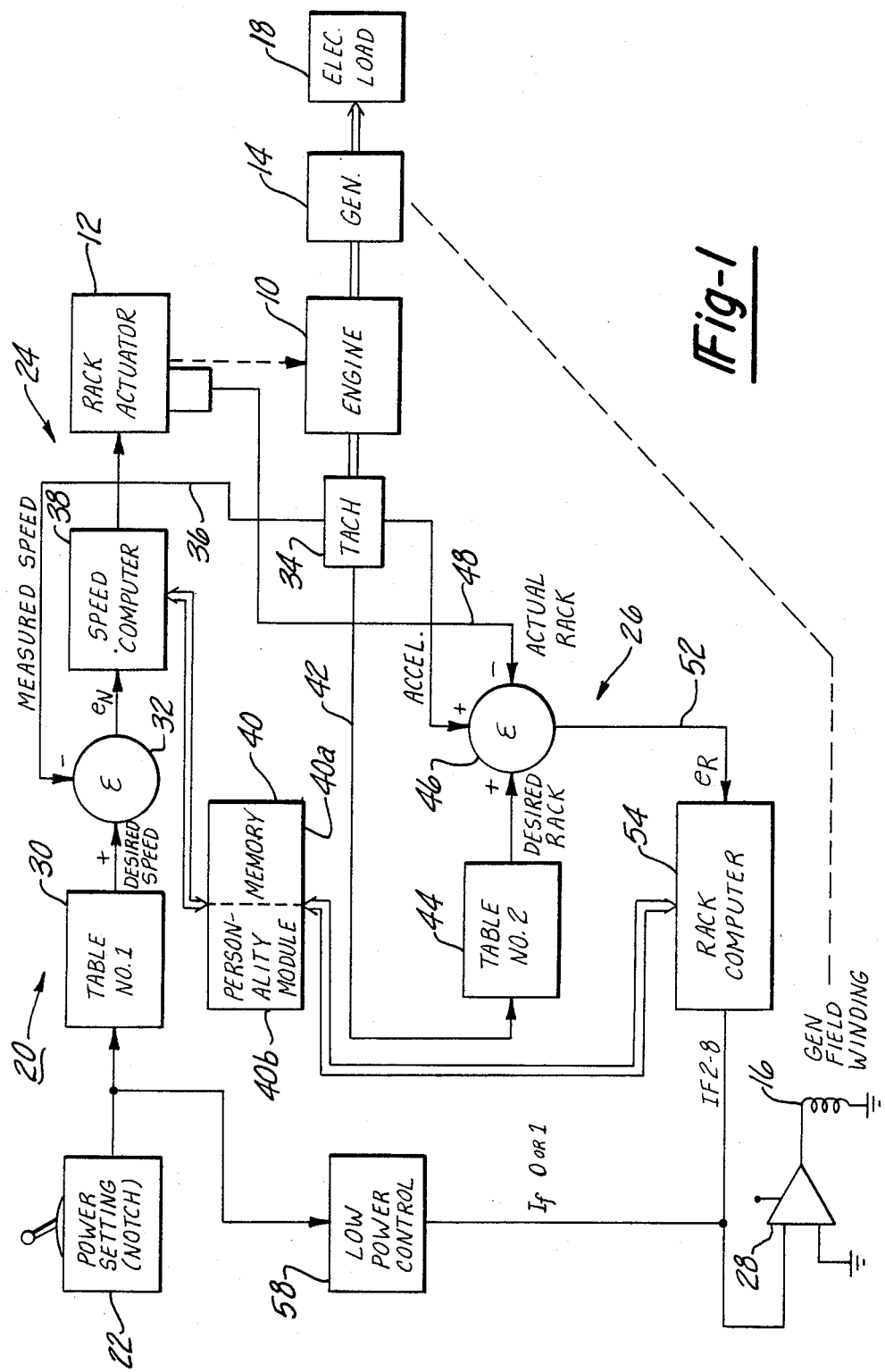
FIG. 1 is a simplified block diagram of an electronic governor for an engine-generator unit and incoporating the invention.

Referring to FIG. 1 a diesel fueled engine 10 having a rack actuator 12 for controlling fuel delivery rate setting is mechanically connected to drive a generator 14 having a variably excitable field winding 16 which controls the power output thereof. The generator is electrically connected to a variable electrical load 18 which, as hereinafter described, may take variety of forms ranging from traction motors to numerous other variable electrical loads. The engine 10 and generator 14 is hereinafter referred to as the engine generator unit 10,14. The engine generator unit 10,14 is connected to be controlled by an electronic governor 20 having a power setting device 22 which may be manually controlled by a human operator or automatically controlled by a program, or semi-automatically controlled using open loop inputs such as from trackside waystations or the like. The power setting of the device 22 is typically implemented to be advanced in steps or "notches" and may comprise a system of electrical switches which produce a mathematically encoded four-bit output signal for power settings from 0–8, 0–16, or whatever numerical sequence suits the particular application. The power setting device 22 can alternatively comprise a system which produces a signal proportional to the desired power setting as will be apparent to those skilled in the art using any number of known devices. Governor 20 further comprises a speed calculator or speed control loop 24 which controls the position of the rack actuator 12 and hence the fuel delivery rate. Governor 20 further comprises a rack calculator or power control loop 26 which calculates a field current setting and applies it to an amplifier 28 for establishing the value of the current through the generator field excitation winding 16.

Describing the system of FIG. 1 in greater detail, the four-bit signal from the power setting device 22 or an appropriately converted signal from the proportional version of power setting device 22 is connected to a look-up table 30 preferably implemented using a read only memory (ROM) to generate a desired engine speed signal for each of the various notches or power settings available in the device 22. The desired speed signal which is output from look-up table 30 is applied to the positive input of a summer 32 which forms a part of the speed calculator 24. The negative input to summer 32 is a measured engine speed signal and is derived from a tachometer 34 actuated by the diesel engine 10 and having an output line 36. The difference between the desired and the measured speed signals is a speed error signal $e_N$ which is connected as the input to a digital processor 38 bearing the legend "speed computer". The speed computer 38 is a state of the art digital processor such as the Motorola 6803 and has a signal transfer characteristic which is a complex function of the speed error signal; i.e. "PID" function indicating an output signal which contains a component proportional to the speed error, a component proportional to the derivative of the speed error, and a component proportional to the integral of the speed error over time or iteration loops. Speed computer 38 is connected to access a memory 40 in which in the formula or results of calculations may be stored. The memory 40 is preferably sub-divided into a random access portion 40a and an add-on ROM 40b which contains certain constants hereinafter defined which are unique to the particular engine 10 and generator 14 and which effectively tailor the governor 20 to the "personality" of the particular unit. Hence memory module 40b is hereinafter referred to as the "personality module".

The output of the speed computer 38 is connected to control the rack actuator 12 to create a fuel delivery rate which will provide an output power which will maintain the engine speed corresponding to the speed demand signal created by device 22. As will be understood by those skilled in the art, the term "rack" is used to refer to a mechanical component of fuel delivery systems used in diesel engines. If other types of fuel burning engines are substituted for the diesel engine 10, the character of the rack actuator 12 will change accordingly. The position of the rack is indicated by a signal from rack position indicator 41.

Tachometer 34 is also connected by way of signal line 42 to a second look-up table 44 which forms part of the rack calculator 26. Look-up table 44 follows the table of FIG. 2 in providing a plurality of pre-programmed desired rack position signals which are known to result in optimum fuel efficiency in the diesel engine 10 under normal operating conditions. Interpolation between these fixed points is provided as hereinafter described. The result is an output from table 44 representing desired rack position. The signal is applied to a first positive input of a signal summer 46. A negative input to the summer 46 is received over line 48 from the rack actuator 12 and represents actual rack position. As will be apparent to those skilled in the art a signal representing the actual position of the mechanical device is readily generated using any number of known devices. A second positive input to the summer 46 is derived from the tachometer 34 and operated on to represent acceleration of the engine 10. This signal is applied to the summer 46 in a sense which aids or adds to the desired rack signal and which opposes the actual rack signal to provide improved accelerational or transitional performance characteristics as hereinafter described. The output for the sum of the signals applied to the summer 46 appears on line 52 and represents rack error $e_R$. This signal is applied to a rack computer 54 which is similar to the speed computer 38 in its physical implementation and is further similar in having a pre-programmed transfer characteristic which is a complex function comprising at least a first factor which is directly proportional to the rack error signal, a second factor which is proportional to the differential of the rack error signal, and a third factor which is proportional to the sum or integral of rack error over a number of iterations or loop calculations times. Computer 54, like computer 38, is connected to access the memory 40 and to obtain empirically determined constants from the personality module 40b for calculation purposes. It is to be understood that although the speed and rack computers 38 and 54 are shown as physically separate devices, they may also be implemented using concatenated processing times in a single processor. Similarly, while the memory 40 (including the personality module 40b) is shown as a single unit it may be implemented using two physically separate memories; however, this tends to defeat the advantage of the personality module 40b which is preferably added to the system as a single element at the time of installation.

The output of rack computer 54 is a field excitation current control signal and is applied to an input of the amplifier 28 to control the current through the field winding 16 and, hence, the power output of the generator 14 as previously described.

FIG. 1 further illustrated an additional feature of the invention in the use of a low power control 58 which senses a "0" or a "1" setting or notch position in the device 22. It has been found preferable in view of unpredictable parasitic loads such as compressors, lights, and other accessory items which are powered either by engine 10 or generator 14 to operate open loop at very low power settings by switching in pre-determined and fixed field excitation levels under these conditions. Accordingly, control 58, which may be implemented as part of the rack computer 54, senses a 0 or 1 position in the device 22 and effectively bypasses or disables the computer 54 to provide fixed field excitation values to the amplifier 28.

Briefly describing the operation of FIG. 1 a notch setting in the device 22 results in the generation of a desired speed signal by table 30 and the development of a speed error $e_N$ from summer 32. Assuming a transient condition in which the speed error signal has not yet settled out to zero, an input to the speed computer 38 is generated and an output or control signal depending upon the particular formula which is solved by the computer 38 is generated and applied to the rack actuator 12. The actuator 12 is advanced or retracted to increase or decrease engine speed. The integral factor of the PID transfer function in computer 38 accumulates small speed errors over time so the speed error eventually goes to zero.

Assuming the power setting at device 22 is neither notch 0 or notch 1, the actual or measured speed signal on line 42 from tachometer generator 34 is applied to the look-up table 44 and results in a desired rack signal being applied to the positive input of summer 46. An actual rack position signal is applied to the negative input by way of line 48. Under steady state conditions these two signals alone are summed and a rack error $e_R$ is applied to the input of the rack computer 54. Under conditions of acceleration or deceleration, an additional positive input is applied to the summer 46 over line 50 representing instantaneous acceleration value of the engine 10. If a command is for positive acceleration (increasing speed per unit time) it is entirely possible in the implementation of the system as shown in FIG. 1 that the acceleration of the engine will require significantly more rack than is called for from the table due to engine inertia and produce a negative rack error when in fact a power output increase is called for. This "dip" is highly undesirable from the standpoint of objective operator performance characteristic and is eliminated by temporarily adding in the acceleration signal via line 50 to compensate for the lag in the desired rack signal. The constant multiplier (hereinafter referred to as $K_{11}$) is empirically derived from engine testing and the same or a different $K_{11}$ factor may be used for deceleration control purposes to avoid an overrun or actual power increase when a contemporaneous power decrease command is generated. In any event the output of the summer 46 is applied to the rack computer 54 and the transfer function thereof iterates a field excitation current setting which is applied to amplifier 28 to control the current through the winding 16.

As previously mentioned, a notched setting of 1 or 0 effectively results in a bypass of the rack computer 54 and the generation of an appropriate field winding excitation setting by control 58 in an open loop fashion.

Figure 3:
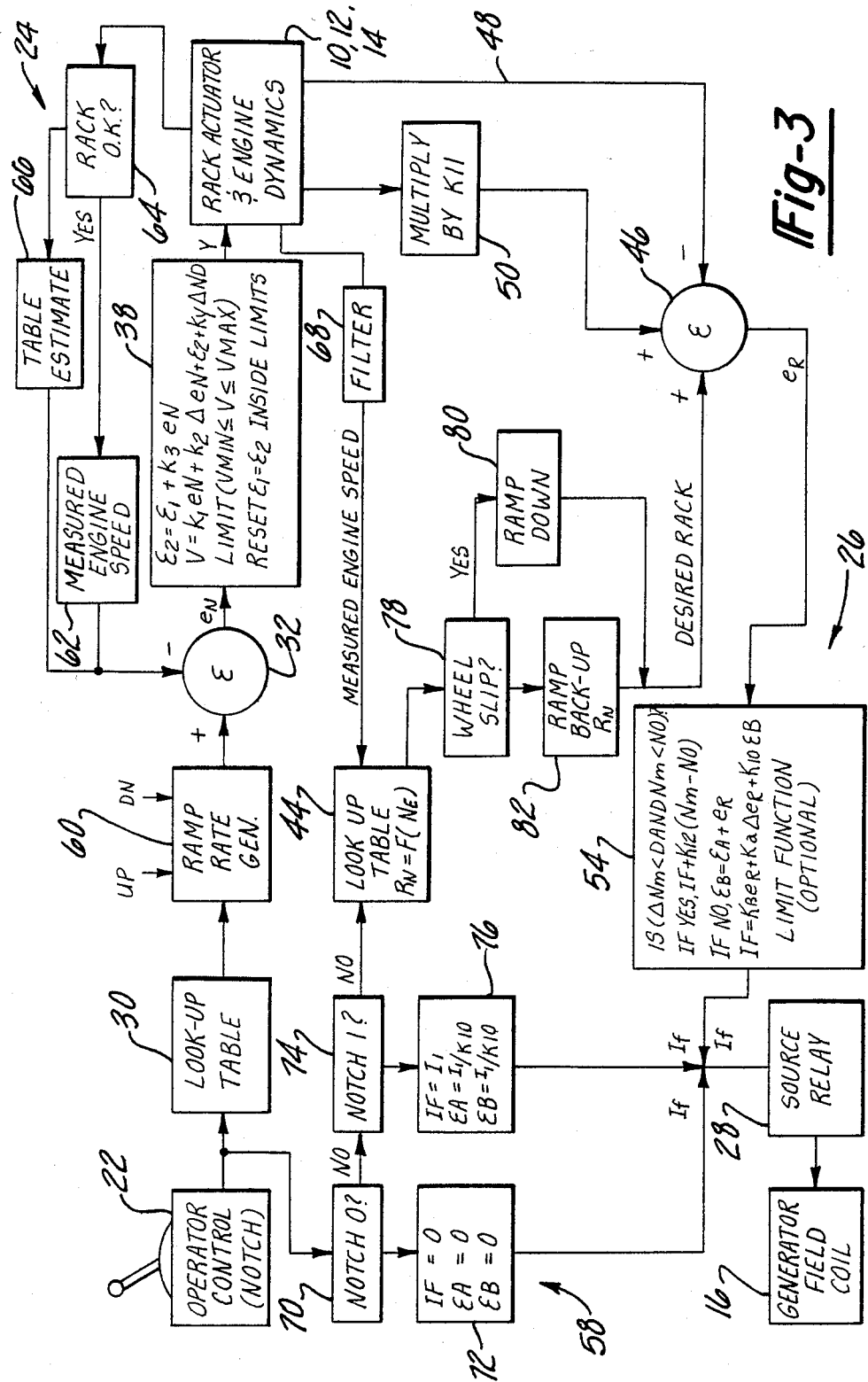
FIG. 3 is a detailed diagram of system organization for a governor employing the invention.

Referring now to FIG. 3 additional features of the invention as found in the preferred embodiment will be described. It is to be understood that the diagram of FIG. 3, like the block diagram of FIG. 1, is arranged partly on a functional basis and partly on a physical basis because of the "best mode implementation" in the form of one or more digital processors having predetermined programs stored in memory. As will be apparent to those skilled in the art, this implementation results in one or more very small and compact electronics devices performing a number of functions which in less sophisticated implementations might be performed by known and physically distinct devices. The invention is intended to embrace not only the digital processor implementation but also other less sophisticated implementations calling for a wide spectrum in the number of individually implemented functions as suits the particular user. The diagram of FIG. 3 is best understood when considered in conjunction with the software or flowcharts of FIG. 4 and the table of terms given at the end of the specification. The flow chart functions are expressed in generic functional terms so that the programmer might implement these functions using hardware and software formats of his own choosing. Referring now to FIGS. 3 and 4B the same basic arrangement of functions as was described with reference to FIG. 1 will be found. However, certain additional control functions as well as additional details of the basic control functions are illustrated in FIG. 3. As a first item, the fundamental implementation of the look-up table 30 is identified by the correspondingly numbered function box in FIG. 4B. As will be apparent to those skilled in the art the conversion from a four-bit signal input (from the notched device 22) to a digital number is a straight-forward matter of look-up in a read only memory. A signal proportional to desired power from a proportional version of the power setting device 22 can likewise be converted to a digital number in straight-forward matter to be used in the look-up table. This output is applied to a ramp rate generator 60 which is part of the calculator 24 to smooth out transitions in desired speed numbers caused by a movement of the operator-controlled level in the device 22. Ramp rate generator 60 causes the desired speed signal to undergo a transition between numbers having a plurality of stair-step type incremental increases or decreases, each increment being of fixed time. Different rates for desired speed signal increases are used for desired speed signal decreases and the generator may be implemented with two or more different increase and decrease rates so that the acceleration or response time of a locomotive used for both yard and mainline work may be adjusted to suit the operator and the application. The flowchart boxes identified by reference numeral 60 provide the implementation for ramp generator 60 in the preferred embodiment using digital computer implementation. The left side of the flowchart area 60 is for ramping up and the right side is for ramping down as will be apparent from an interpretation of the various legends.

Summer function 32 is correspondingly numbered in FIG. 4B and, as is apparent, involves an arithmetic combination of two numbers.

Looking now to the calculator block 38 of FIG. 3 it can be seen that the transfer characteristic from speed error $e_N$ to the voltage V which is applied to the rack actuator 12 is a complex function involving four factors, the multipliers or coefficients for the four factors being $K_1$, $K_2$, $K_3$, and $K_4$ respectively. These factors will be referred to in the following paragraphs by the respective coefficients alone. The last or bottom line in block 38 of FIG. 3 simply indicates that the voltage must be within the limits of available potential. The calculation blocks are correspondingly numbered with reference numeral 38 in FIG. 4B.

The first or $K_1$ factor of the transfer function is the speed error itself; i.e. this is the "direct" in the transfer function. The second factor or $K_2$ factor is the change in speed error as between two consecutive loop times. The third or $K_3$ factor is a summed or integrated factor so that a steady state voltage V is produced after the transient has passed and the speed error $e_N$ has gone to 0. The fourth or $K_4$ factor is proportional to the change in desired speed and may be considered optional although desirable. As will be apparent the $K_4$ factor is essentially an acceleration factor and tends to advance or retract rack faster if a very large speed increase is commanded and slower if a small increase is commanded. This use of an acceleration figure tends to improve the objective operator performance characteristics of the system as previously described.

Figure 4A:
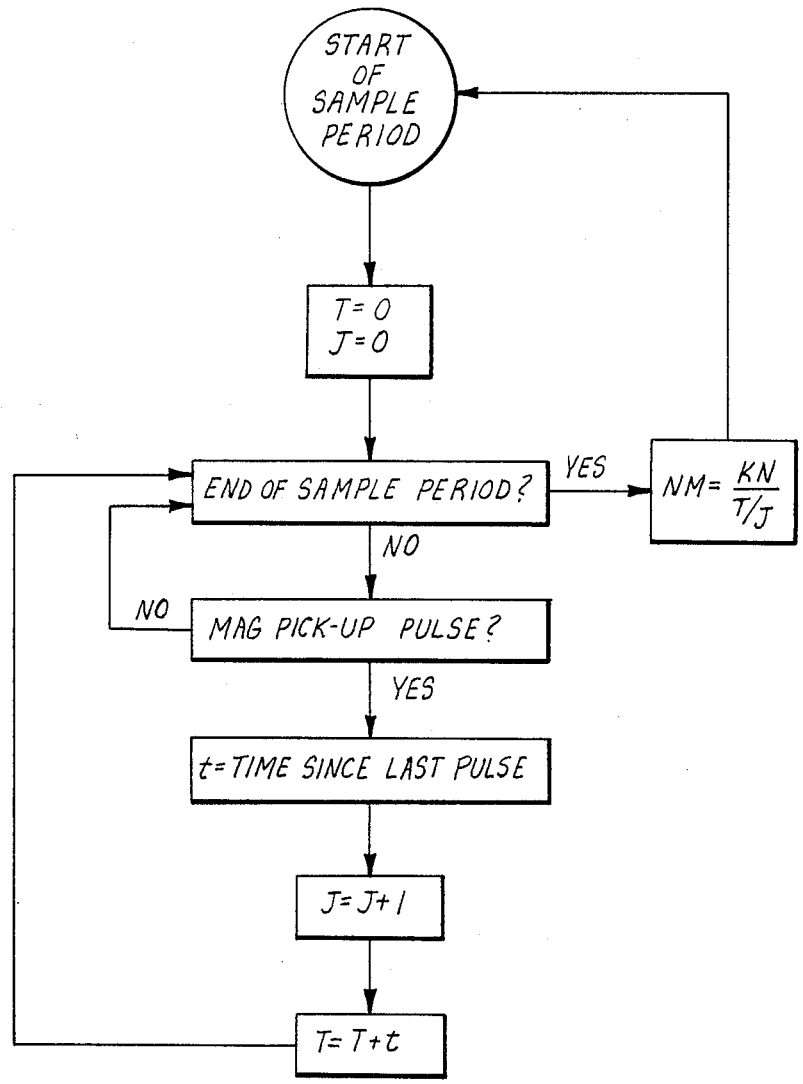
FIG. 4A is a flowchart of certain functions performed by the speed calculator.
Figure 4B:
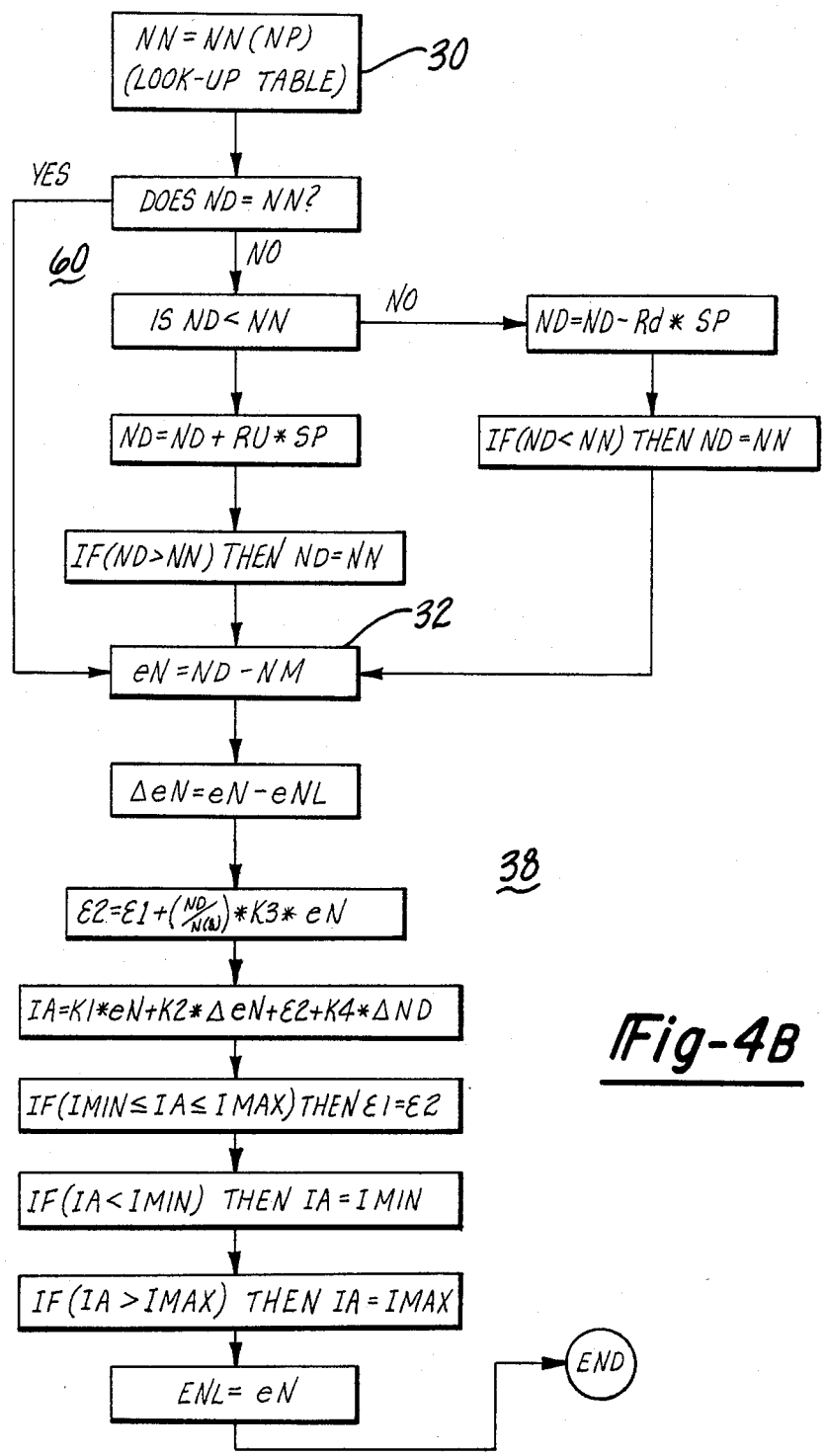
FIG. 4B is a flowchart of certain additional functions performed by the speed calculator.

FIG. 3 further illustrates a function block 62 which is illustrated in FIG. 4A. This is essentially the generation of a filtered or loop-averaged measured engine speed signal to be applied to the negative input of the summer 32. The effect of this function is essentially the same as that of an averaging device so that the actual speed signal applied to the summer is a more accurate function of actual engine speed than one measured over several engine revolutions.

Figure 4C:
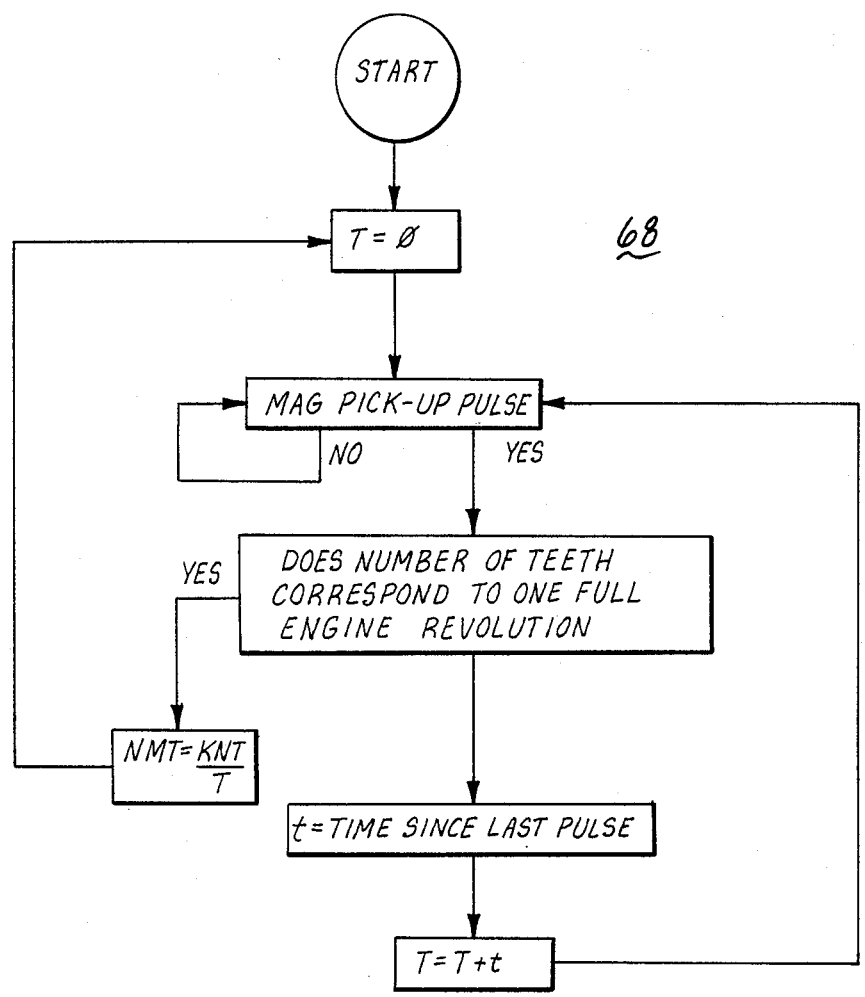
FIG. 4C is a flowchart of certain still further functions performed by the speed calculator.
Figure 4D:
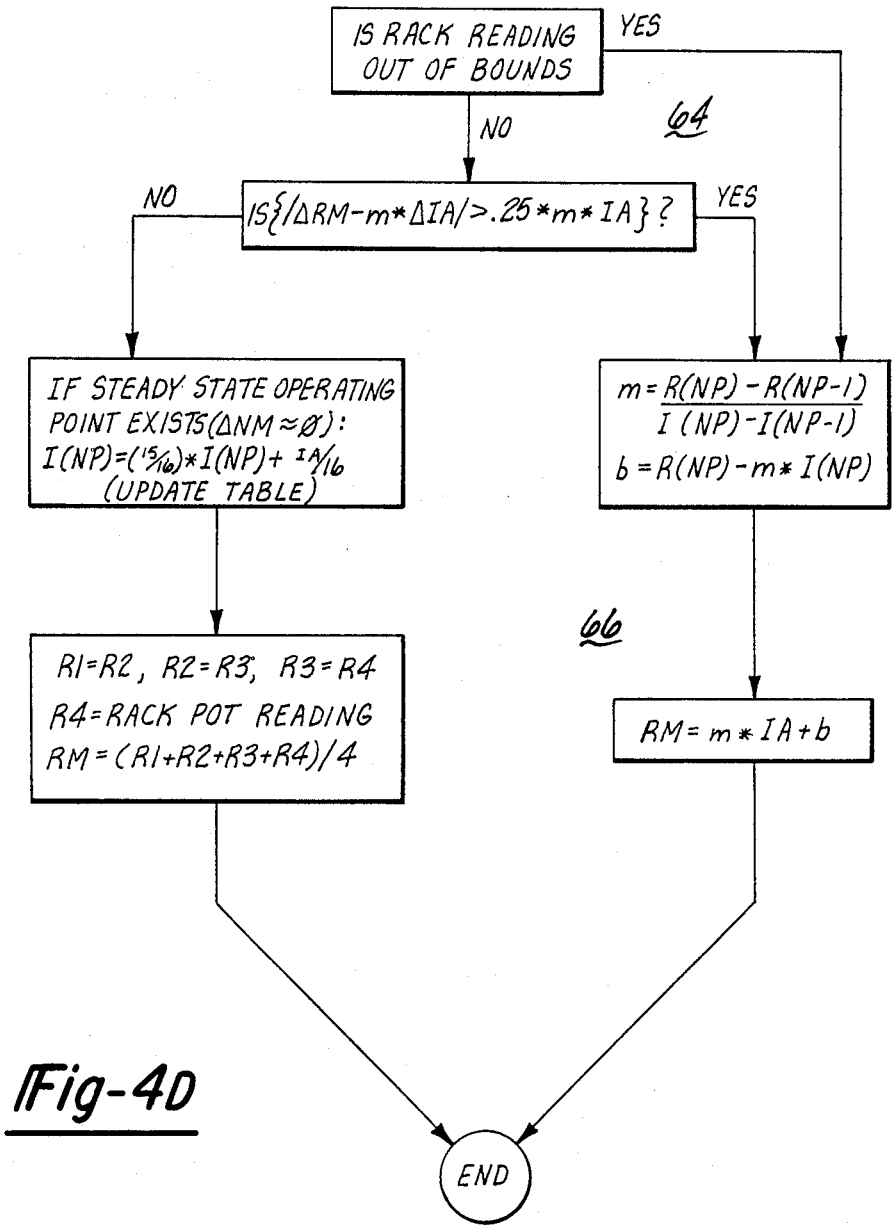
FIG. 4D is a flowchart of a rack measurement/default function performed by the speed calculator.

Referring now to FIGS. 3 and 4D, a backup function in the event of a rack position sensor failure; i.e., an electrical or mechanical failure in the position sensor, is provided. Function block 64 in FIG. 3 and Flowchart area 64 in FIG. 4D indicate an approach to a determination that a rack position sensor failure has occurred. In this case it is simply a matter of indicating the rack position has failed to change by some pre-determined amount in the face of a rack position change command. Under these circumstances, function block 66 in FIG. 3 indicates on the left side a software implemented operation on measuring four rack potentiometer readings and averaging them and storing the resulting average rack potentiometer signal in a particular storage location referred to as a "table" in memory 40. The right side of FIG. 4D is an indication that in the event of an indicated rack position sensor failure, the calculator 24, in function block 66, uses the last recorded rack actuator position average as the basis for generating a measured rack position signal.

Referring now to FIGS. 3 and 4C a second measured engine speed signal is generated by a filter function block 68 which may be implemented in either calculator 24 or 26 but in this instance is implemented in the field control loop or calculator 26. The purpose of the routine shown in the flowchart of FIG. 4C is to generate a measured engine speed signal for application to the look-up table 44 over one or more revolutions of engine 10 to dramatically increase the response time and stability of the field control loop 26.

Continuing with the detailed description of the field control loop or rack calculator 26, the notch number from device 22 is fed to open loop control 58 which functions to determine whether the operator has called for notch position "0" or notch position "1". If, as previously described, the operator had called for one or the other of these low notch positions, the field current setting will be made on a fixed and open loop basis. To this end, function block 70 performs a measurement and logical determination to determine whether the "0" notch position has been commanded. If this is the case, function block 72 sets the field current and two mathematical terms to prescribed low levels for control of source relay 28 and the generator field coil 16. The rack computer 54 is effectively inoperative; i.e., in the preferred implementation as indicated in FIG. 4E, the computational functions indicated by blocks 70 and 72 are preferably combined with the computational functions of block 54 in a common digital processor which, of course, remains operative at all times.

If device 22 calls for notch position "1" the decision block 70 passes the analytical function to block 74 which detects the presence of the "1" notch position and activates function block 76 to set a second set of field current and mathematical values in accordance with previously calculated field current figures. Again, block 76 pre-empts the function of the rack computer 54.

Figure 4E:
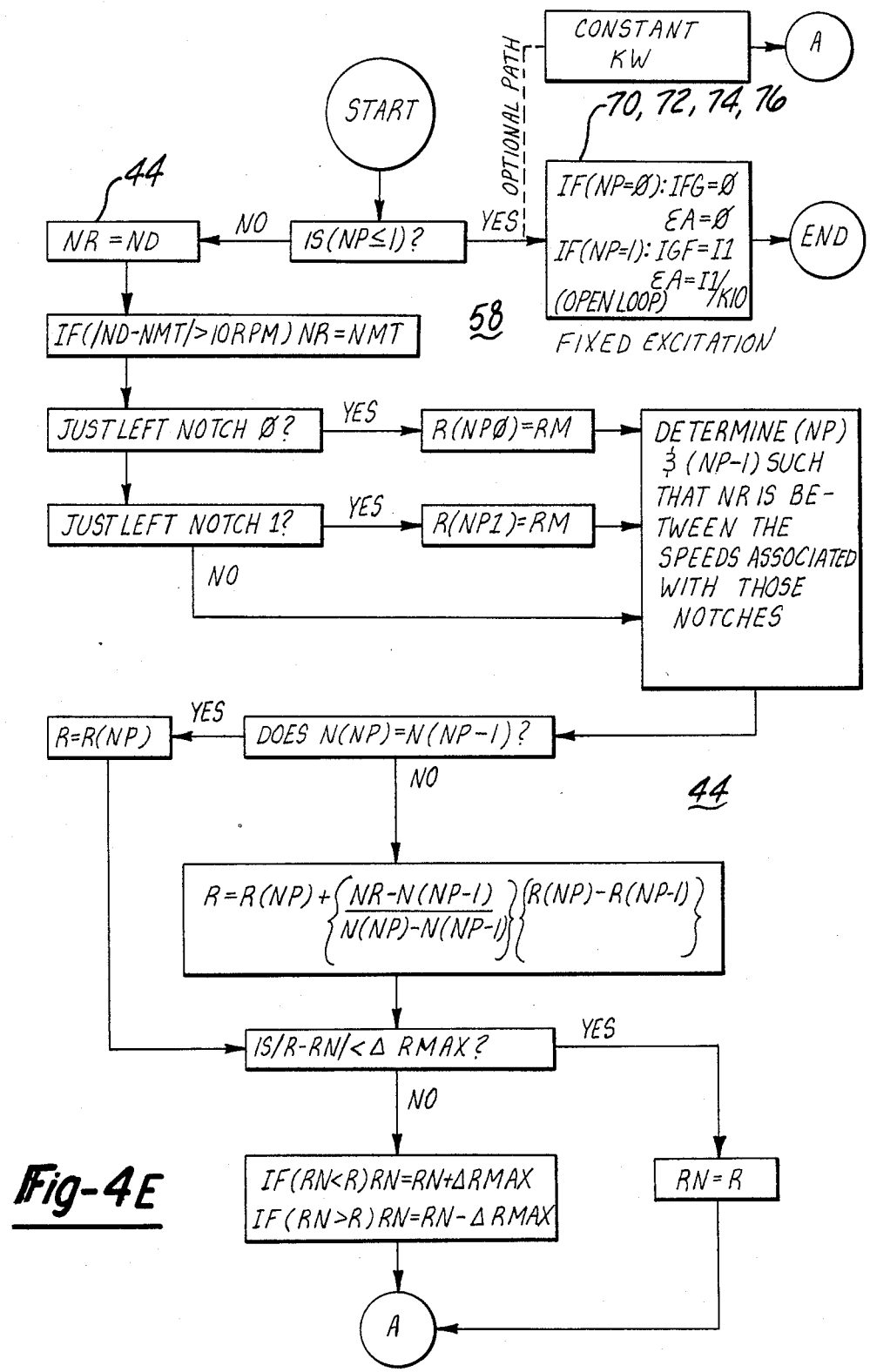
FIG. 4E is a flowchart of certain functions performed by the rack calculator.

FIG. 4E illustrates the open loop field current calculation function of blocks 70, 72, 74, and 76.

Assuming that a higher notch position is commanded through device 22 the determination of the desired rack signal for application to summer 46 is passed on to the look-up table 44. As previously mentioned, the device 22 is provided with a fixed number of notch positions or power settings and does not, in itself, provide any proportional control between those settings in the locomotive case being described. In the case of proportional input from device 22 the look-up table functions the same. However, measured engine speed obviously varies relatively smoothly between settings in a proportional or infinitely variable fashion and it is desirable to produce desired rack signals which are proportional to measured engine speed between the optimum operating points shown in FIG. 2; i.e., the desired rack signal will follow straight line segments between the optimum operating points of FIG. 2. As will be apparent to those skilled in mathematics, this proportional control calls for an interpolation function which is represented in the function blocks of flowchart 4E in the area of referenced numeral 44.

In accordance with a further feature of the invention the desired rack signal is adjusted in the presence of a wheel-slip condition; i.e., in the application to traction motor powered vehicles it is desired to reduce the power applied to the traction motors by the generator 14 in the event that the driving wheels lose traction and begin to spin. The mechanism for detecting wheel-slip is represented by function block 78 in FIG. 3. As will be apparent to those skilled in the art, the physical implementation of a wheel-slip detector can take a variety of forms including, for example, a comparator receiving rate signals from driven and idler wheels or a comparator receiving rate signals from each of several driven wheels on different axles. Referring further to FIG. 3 and to FIG. 4F, the detection of a wheel-slip condition in function block 78 results in a downramping of the desired rack signal as indicated by function blocks 80 in FIGS. 3 and 4F. Through summer 46 this results in a field current reduction which cures the wheel-slip condition and restores traction. Once the wheel-slip has been eliminated, function block 82 operates to ramp the desired rack signal back up to the setting commanded by look-up table 44 in response to the measured engine speed signal from filter 68.

Figure 4F:
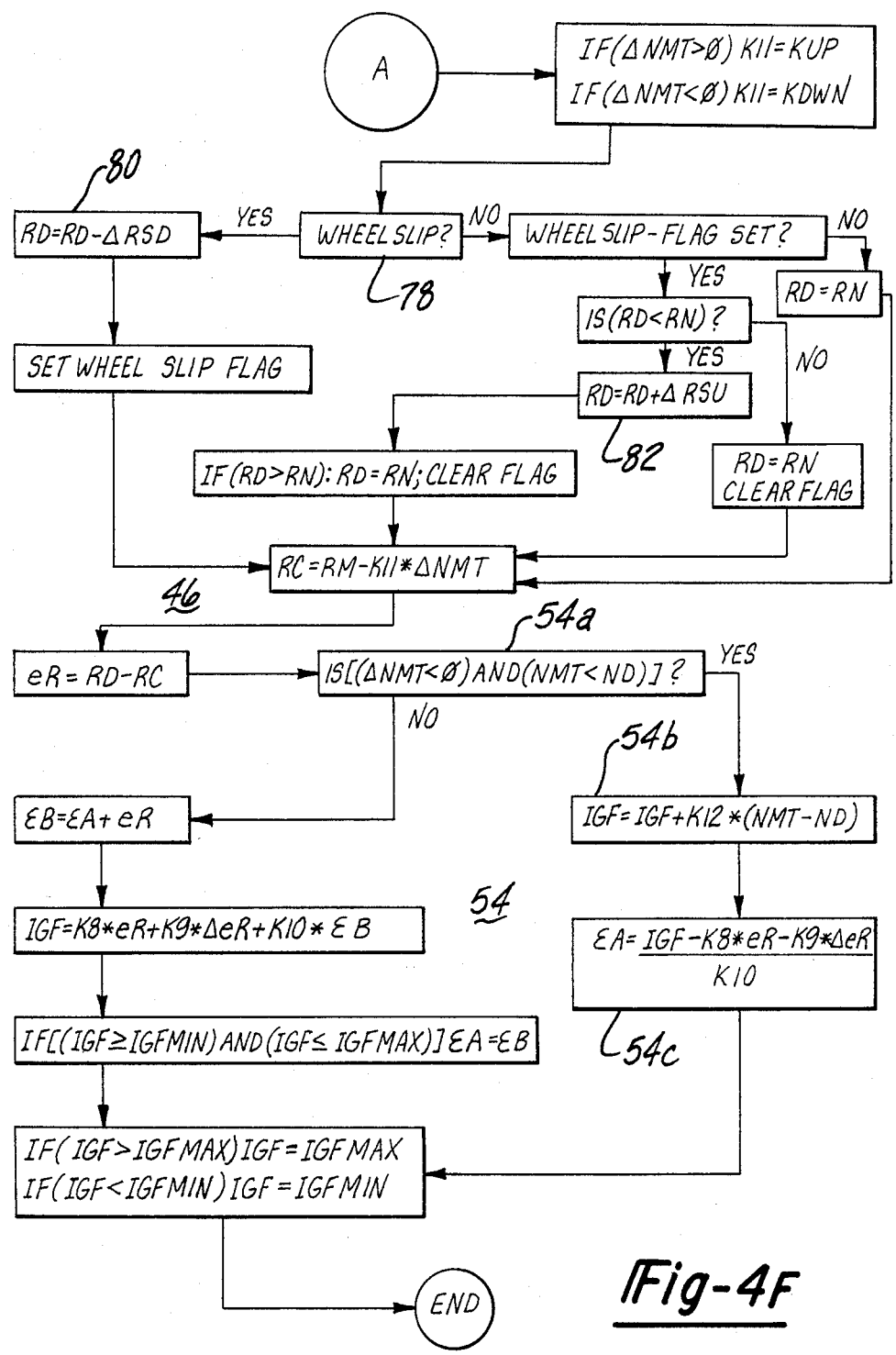
FIG. 4F is a flowchart of additional functions performed by the rack calculator.

Continuing with the description of FIGS. 3 and 4F in the area of the summer 46 and the rack computer 54, the summing function involves three input signals; viz., desired rack, engine acceleration multiplied by the constant $K_{11}$ and measured rack. As will be apparent to those skilled in the computer art a three input summing function is actually carried out in two steps. The first of which is the subtraction of the acceleration factor on line 50 from the measured rack signal on line 48, and the second of which is the summing of the result of the first step calculation with the desired rack signal to produce the rack error $e_R$.

Looking now to the rack computer 54 the details of calculations for this area are illustrated by the legend in block 54 of FIG. 3 and also in the function blocks of the flowchart, FIG. 4F. As previously described the transfer function of computer 54 is of the PID (proportional, integral, differential) type consistent with established control theory. The constants $K_8$, $K_9$, and $K_{10}$ and empirically determined and retrieved from the personality module 40b which makes up the computer memory shown in FIG. 1.

As indicated by function blocks 54a, 54b and 54c in flowchart FIG. 4F, means are provided to detect and deal with an engine overload condition in which summer 32 indicates that the system is below desired speed and that speed is decreasing. Under this condition the field current is reduced by the $K_{12}$ factor. Note that while flowchart function block 54b indicates the addition of the $K_{12}$ factor to the generator field current IGF, the ND figure is greater than NMF figure and changes the sign of the $K_{12}$ factor to produce a negative rack error. As indicated by function block 54c in flowchart 4F and $K_8$, $K_9$ and $K_{10}$ factors are effectively eliminated from the transfer function and field current is reduced despite the fact that normal load control operation continues to call for an increase in field current.

Figure 4G:
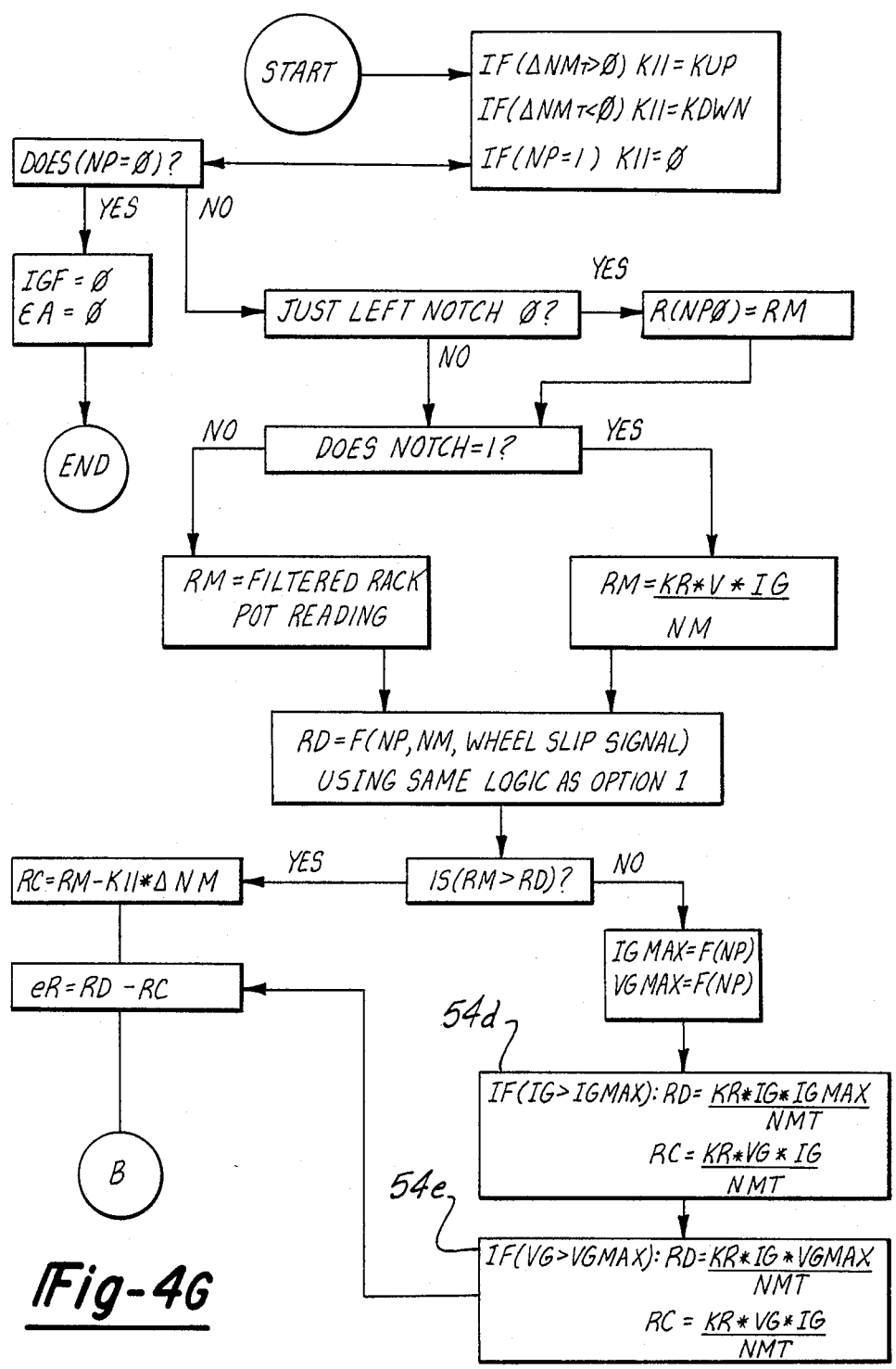
FIG. 4G is a flowchart of an optional function sequence performed by the rack calculator and using generator voltage and current limits.
Figure 4H:
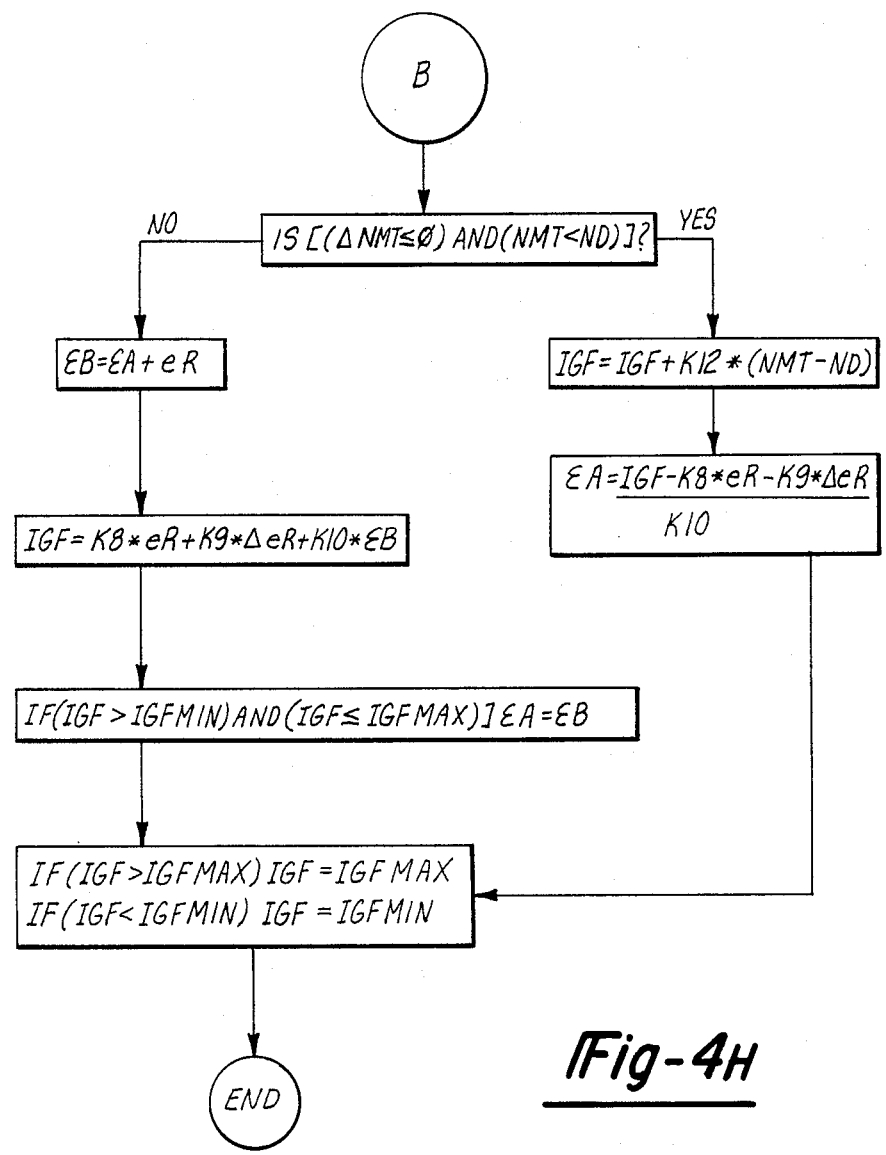
FIG. 4H is a continuation of FIG. 4G.
Figure 41:
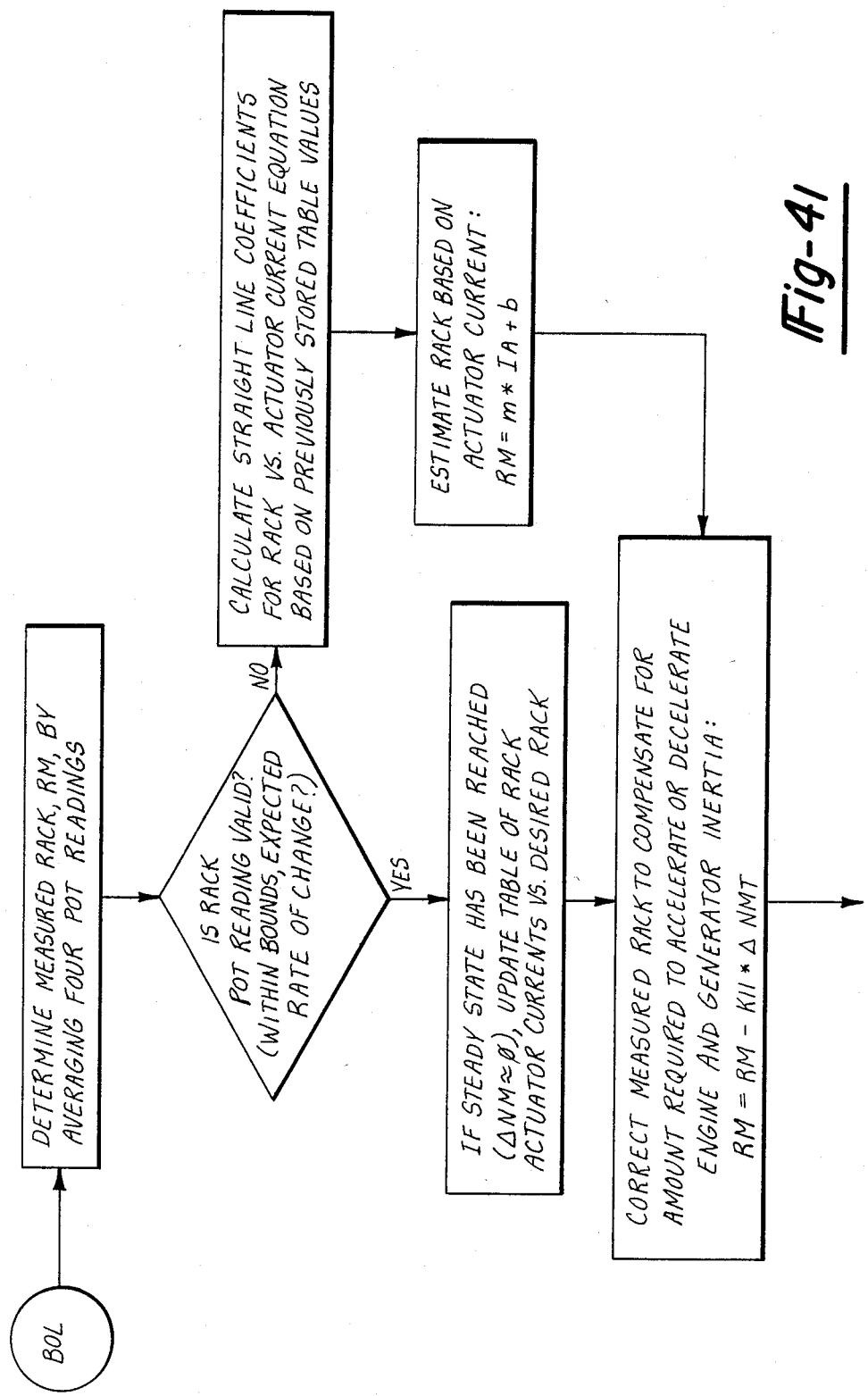
Figure 4K:
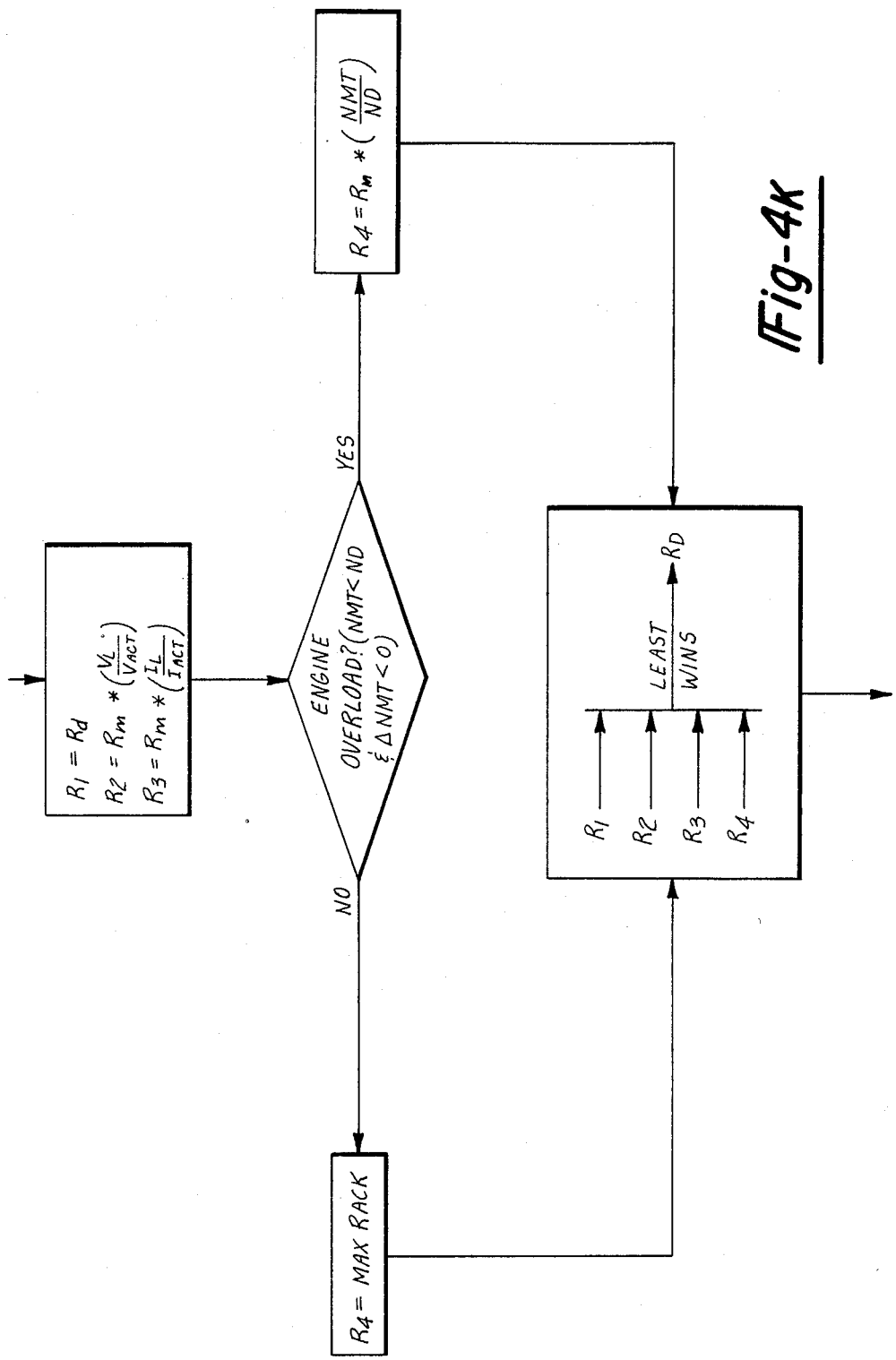
Figure 4L:
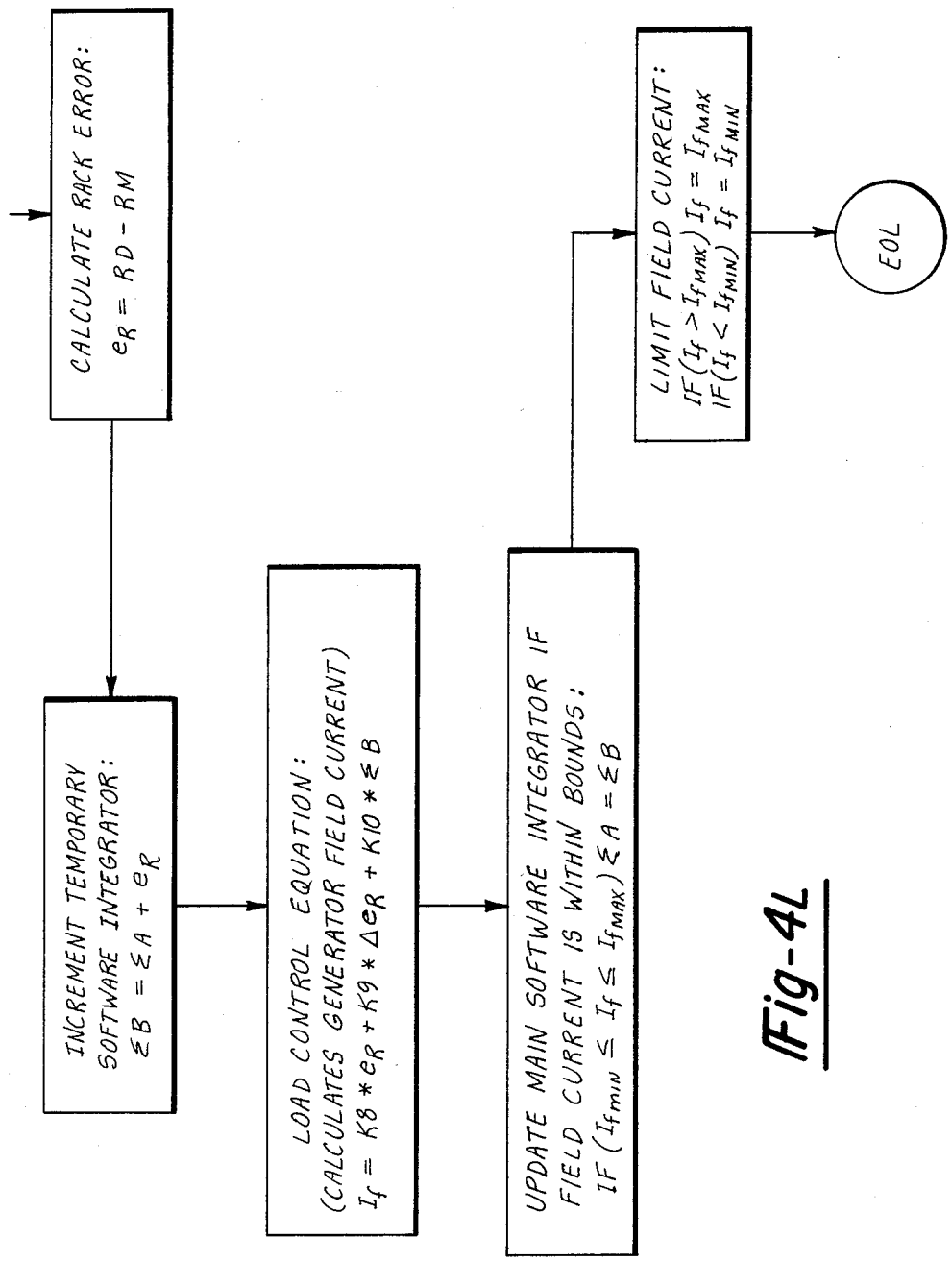

FIG. 4G illustrates an optional field current control system in which maximum current and voltage levels are established for all power settings and means are provided to prevent the unit from exceeding these values. To implement this control function it is, of course, necessary to provide measuring devices such as current shunts and voltage meters in the main generator output of the engine generator unit to provide actual current and voltage signals to the computer 54.

If, as shown in FIG. 4G, the main generator current exceeds the pre-established maximum (function block 54d) the desired rack or RD and RC figures are recalculated and used to control field current. Similarly if the main generator voltage is outside of the upper limit, the desired rack signal is again recalculated on the basis of the allowable maximum and used to control the amplifier 28. Another optional field current control system in which constant power from the engine-generator unit can be provided in the lower notches by using the information from measuring devices in the main generator circuit instead of using the fixed excitation method previously described. To implement this control function the actual current and voltage signals to the computer 54 are required. If as shown in FIGS. 4I through 4L the constant power function is selected then the associated desired power is determined from the look-up table. A desired rack which would equate to the limit for either field current or field voltage is calculated. The minimum desired rack from that calculated from either the wheel slip ramp rate logic, the current limit or voltage limit is then selected in the control equation.

INDUSTRIAL APPLICABILITY

Figure 5:
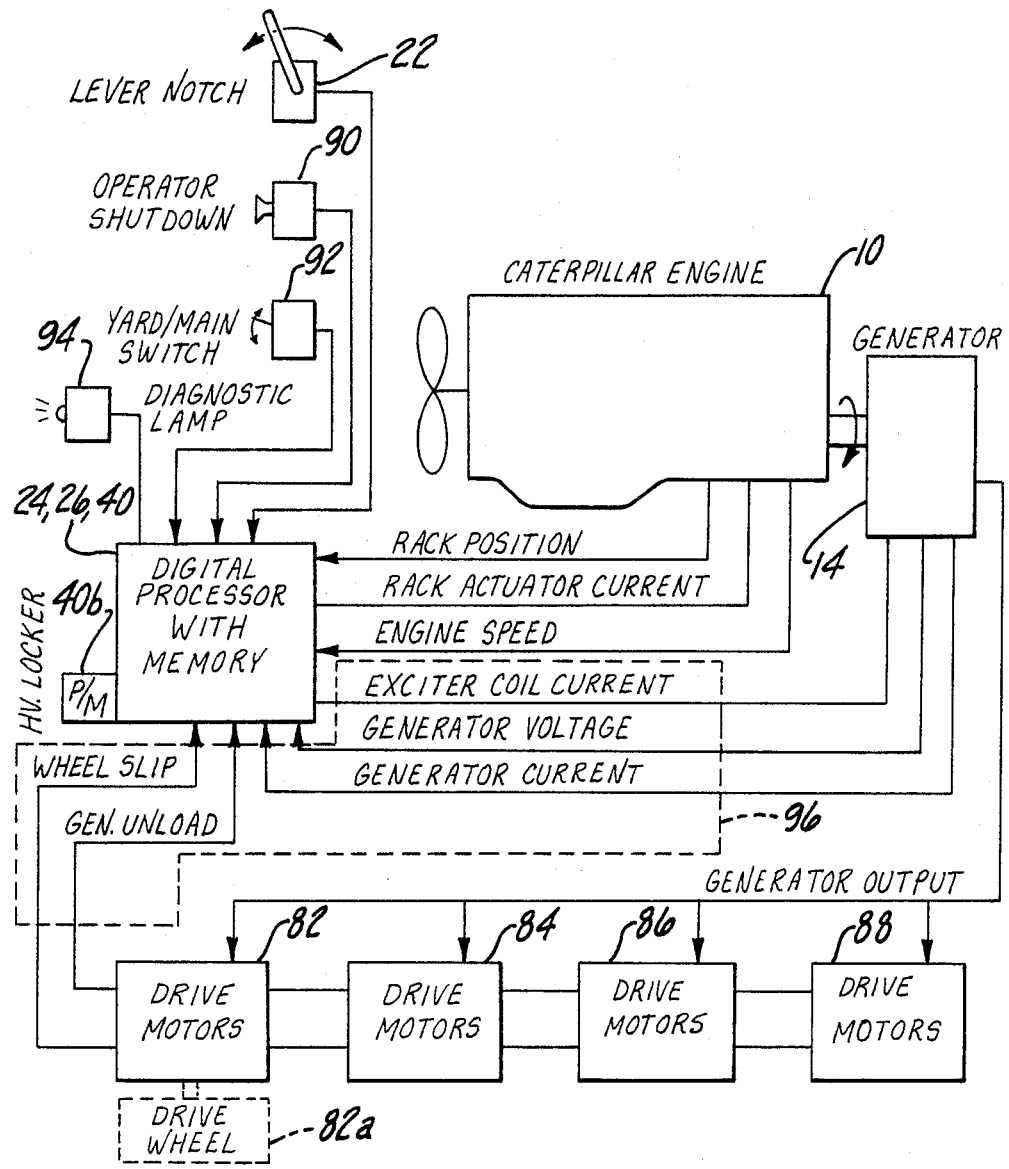
FIG. 5 is a block diagram of the invention as applied to the control of a diesel electric generator unit for a locomotive.

Referring now to FIGS. 5 and 6 the application of the governor of the present invention will be described as applied to the control of an engine 10 and generator 14 in a diesel electric locomotive having traction motors 82, 84, 86 and 88 connected to receive power from the generator 14. As shown in FIG. 5 an operator-controlled notch device 22 is provided for the programming of power commands. This device is connected to a digital processor 24, 26, 40 having a personality module 40b which is a ROM having the constants $K_1$ through $K_{13}$ which are peculiar to the engine 10 and generator 14 permanently stored therein. The operator controls/signals further include a shut-down switch 90 which preferably includes a "generator unload" capability so that the locomotive may be idled with no power going to the traction motors 82, 84, 86, and 88 regardless of engine speed. The generator unload switch may optionally be located within a high-voltage locker 96 which is within the physical confines of the diesel locomotive. Operator controls/signals further include a yard/main switch 92 which sets the ramp rates of ramp rate generator 60 so as to produce rapid acceleration performance capabilities for yard work and less rapid smoother acceleration characteristics for main line work. Finally, a diagnostic lamp 94 is provided to indicate that the rack measurement/default system of FIG. 4D has determined the rack position sensor 12 to be inoperative and that the engine is running on previously stored rack position/speed numbers stored in table 66 over some period of time. This is an indication that normal performance cannot be expected and that service is required upon reaching a service station.

As shown in FIG. 5 the processor 24, 26, 40 is connected to receive rack position and engine speed signals from the engine 10 and is connected to deliver a rack actuator current to the fuel controlled mechanism associated with the engine 10; i.e., the rack actuator identified by reference numeral 12 in FIG. 1. Similarly the generator 14 is connected to deliver generator voltage and generator current signals to the processor 24, 26, 40 for the purpose of implementing the power limited load control options of FIGS. 4G and 4I. The generator is connected to receive the field excitation current to control the power applied to the traction motors 82, 84, 86 and 88.

Referring to FIG. 6 a typical operating condition and the response of the system shown in FIGS. 1, 3, 4 and 5 will be described. The diesel electric locomotive is assumed to be operating at a desired engine speed correlated with notch position 2 in device 22. The operator advances the device 22 to notch position 4 calling for an increase in engine speed and an increase in power delivered to the traction motors 82, 84, 86 and 88. The dynamics of the rack actuator 12 are such as to exhibit entirely different (much shorter) time constants than the dynamics of the engine 10. Accordingly, the actual rack position may be very quickly advanced by the now extant speed error $e_N$ while the measured speed signal and, hence, the desired rack signal applied to summer 46 changes quite slowly. As a result, the system of FIGS. 1 and 3 might ordinarily generate a large negative rack error which would reduce power at the same time the operator is calling for a power increase. To overcome this condition, $K_{11}$ factor or engine acceleration factor is applied to the summer 46 to aid the desired rack signal and actually boost rack (and power) beyond that theoretically needed to ramp from the first to the second speed positions as shown in the upper diagram of FIG. 6; i.e., the lower diagram of FIG. 6 illustrates the effect of the $K_{11}$ factor to produce an artificial rack boost during the acceleration time to prevent the power dip usually associated with notch position increases in diesel electric locomotives. Note also in the lower diagram of FIG. 6 that as the engine reaches the newly commanded speed position associated with notch 4, the $K_{11}$ factor goes negative and avoids an overshoot condition which would otherwise exist in the control loop until damped out by return to a stable system operating position.

The following table provides definitions for the factors illustrated in FIGS. 3 and 4 to assist the user of the present invention in developing commands for the implementation of the invention according to the best mode.

TABLE 1

| | FLOWCHART DEFINITIONS |
|---|---|
| NM = | measured engine speed (loop average filtered) |
| KN = | engine speed vs. mag pick-up pluse time conversion constant |
| NN = | notch engine speed |
| ND = | desired engine speed at any instant |
| SP = | control sample period |
| Rd = | speed change ramp rate in decreasing direction (adjustable) |
| Ru = | speed change ramp rate in increasing direction (adjustable) |
| $e_N$ = | speed error |
| $e_{NL}$ = | speed error during previous sample period |
| $E_1, E_2$ = | engine speed control equation software integrators |
| $K_1, K_2$ = | speed control equation constants |
| $K_3, K_4$ = | sized for application |
| $I_{MIN}$ = | minimum rack actuator current |
| $I_{MAX}$ = | maximum rack actuator current |
| IA = | rack actuator current |
| $\Delta e_N$ = | change in speed error since last sample period |
| I(NP) = | table value for rack actuator current at given notch position |
| R(NP) = | table value for desired rack position at given notch position |
| m,b = | rack vs actuator current conversion coefficients |
| RM = | measured rack |
| NP = | notch position |
| IGF = | generator field current |
| I1 = | open loop field current for notch 1 |
| NR = | speed valve used for determination of desired rack |
| N(NP) = | table value for notch speed |
| R = | desired rack before rate of change limits |
| RN = | rate of change limited desired rack |
| $\Delta$ RMAX = | maximum allowable rate of rack change in one sample period |
| RD = | wheel slip limited desired rack |
| RC = | measured rack corrected for engine acceleration |
| $e_R$ = | rack error |
| A &, B = | load control equation software integrators |
| $K_8, K_9, K_{10}$ = | load control equation constants; |
| $K_{12}$ = | sized for application |
| VGMAX = | generator output voltage limit (optional) |
| IGMAX = | generator output current limit (optional) |
| IGFMIN = | generator field current minimum value |
| IGFMAX = | generator field current maximum value |
| $K_{11}$ = | rack acceleration correction factor during accel. |
| | rack acceleration correction factor during deceleration |
| KR = | generator power to rack position conversion factor |
| IG = | generator output current (optionally measured) |
| VG = | generator output voltage (optionally measured) |
| NMT = | measured engine speed (torsional average filtered) |

We claim:
1. A control system for an engine-generator unit (10,14) of the type having a fuel delivery control (12) and a field current controller (28), comprising:
 a power selector (22) having a plurality of selectable power settings;
 speed calculator means (24) for deriving a speed error signal as a function of the power selector setting and the actual engine speed and for applying an output which is a function of the speed error signal to the fuel delivery controller (12); and
 rack calculator means (26) for deriving a rack error signal as a function of actual engine speed and actual fuel delivery controller setting and for applying an output to the field current controller (28) which is a function of the rack error signal.

2. A control system as defined in claim 1 wherein the speed calculator means (24) comprises a digital processor (38) and a memory (40) to which the processor has access, said memory having stored therein a formula including empirically determined constants associated with a given engine calculating the fuel delivery controller setting as a function of the speed error, the derivative of the speed error and the summation of several calculated speed errors, the processor (38) being operative to iteratively solve said formula to vary the setting of the fuel delivery controller (12) in such a direction so as to reduce the speed error signal to zero.

3. A control system as defined in claim 2 wherein the memory (40) is physically sub-divided into at least two sections, (40a, 40b) the constants being stored in one section (40b) and the formula in another section (40a).

4. A control system as defined in claim 1 wherein the rack calculator means (26) comprises a digital processor (54) and a memory (40) to which the processor has access, said memory having stored therein a formula including empirically determined constants associated with a given engine-generator unit for calculating the field current setting as a function of the rack error, the time rate of change of the rack error and the intergral of several rack errors to vary the field current controller setting in such a direction as to reduce the rack error to zero.

5. A control system as defined in claim 4 wherein the memory (40) physically sub-divided into at least two sections, (40a, 40b) the constants being stored in one section (40b) and the formula in another section (40a).

6. A control system as defined in claim 1 wherein the rack calculator means (26) further comprises means (50) for modifying the rack error and response to engine acceleration.

7. A control system as defined in claim 6 wherein the means (50) modifying comprises means (34, 50) for producing a signal quantity proportional to engine acceleration and means (46) for arithmetically combining said signal quantity in opposition to a signal quantity representing the actual setting of the fuel delivery controller.

8. A control system as defined in claim 1 further including means (60) connected between said power selector (22) and said speed calculator means (24) for time modulating the power selector setting signal so as to effectively produce a ramp function in response to an abrupt change.

9. A control system as defined in claim 8 and further including means (92) to change the ramp rate of said means for time modulating.

10. A control system as set forth in claim 1 further including means (64) for detecting an erroneous indication of the position of the fuel delivery controller and means (66) for producing substitute controller setting signals for the speed calculator.

11. A control system as defined in claim 1 further including means (58) responsive to a low power setting of said power selector for providing a predetermined power output independent of said rack calculator means.

12. A control system as defined in claim 1 further including at least one traction motor (82, 84, 86, 88) having a drive-wheel (82a) connected to be powered by said engine-generator unit, means (78) for detecting a slip condition in said wheel and means (80) for reducing the field current setting to eliminate the slip condition.

13. A control system as defined in claim 1 further including means (54) for detecting the existence of an increasing speed error and for reducing the field current setting in response thereto.

14. A control system as defined in claim 1 further including means (54) for maintaining the power output of the generator within pre-determined voltage and current limits.

15. A method of controlling the operation of an engine-generator unit of the type having a rack position control and a field current control comprising the steps of
(a) generating a power setting signal
(b) developing a desired speed signal from the power setting signal
(c) developing a speed control error $e_N$ from a comparison of the desired speed signal and actual speed
(d) setting the rack control as a complex function of $e_N$
(e) developing a desired rack signal from the actual speed;
(f) developing a rack error $e_R$ from a comparison of desired rack and actual rack position; and
(g) setting field current as a complex function of $e_R$.

16. The method defined in claim 15 further including the steps of
(h) developing a field current setting for at least one low power setting; and,
(i) substituting the fixed field current setting for the complex function of $e_R$ when the power setting is in the low power setting.

17. A method as defined in claim 15 further including the steps of
(j) detecting engine acceleration; and,
(k) modifying $e_R$ in accordance with the detected engine acceleration.

18. The method defined in claim 15 wherein the complex function for setting rack control is based at least in part on the formula $K_1 e_N + K_2 \Delta e_N + K_3 \Sigma e_N$.

19. The method set forth in claim 15 wherein each of the complex control functions contains a proportional term, a derivative term and an integral term.

20. The method defined in claim 15 further including the step of maintaining a record of actual rack positions associated with power commands and utilizing said record to develop rack errors in the event of a malfunction in the rack position sensor.

21. The method defined in claim 15 further including the steps of substituting a fuel delivery position to develop a field current setting from the complex function of $e_R$ when the power setting is set for low power.

22. A control system for a combination engine-load unit (10,14) wherein the power consumption of the load is variable according to a signal applied to a control input of a load controller (28), and wherein the engine is of the type having a fuel delivery control (12) comprising:
a power selector (22) having a plurality of selectable power settings;
engine speed calculator means for deriving a speed error signal as a function of the power selector setting and the actual engine speed and for applying an output which is a function of the speed error signal to the fuel delivery controller (12); and,
rack calculator means (26) for deriving a rack error signal as a function of actual engine speed and actual fuel delivery controller setting and for applying a control signal to the control input of the variable load controller (28) which is a function of the rack error signal.

* * * * *